US007878046B2

(12) United States Patent
Bolt et al.

(10) Patent No.: US 7,878,046 B2
(45) Date of Patent: Feb. 1, 2011

(54) EVAPORATIVE EMISSION SYSTEM TEST APPARATUS AND METHOD OF TESTING AN EVAPORATIVE EMISSION SYSTEM

(75) Inventors: Louis Scott Bolt, New Hudson, MI (US); Michael Dew, Royal Oak, MI (US)

(73) Assignee: MAHLE Powertrain, LLC, Novi, MI (US)

( * ) Notice: Subject to any disclaimer, the term of this patent is extended or adjusted under 35 U.S.C. 154(b) by 316 days.

(21) Appl. No.: 12/009,035

(22) Filed: Jan. 16, 2008

(65) Prior Publication Data

US 2008/0178660 A1 Jul. 31, 2008

Related U.S. Application Data

(60) Provisional application No. 60/880,756, filed on Jan. 16, 2007.

(51) Int. Cl.
*G01M 3/04* (2006.01)

(52) U.S. Cl. ...................................................... 73/49.7

(58) Field of Classification Search .................. 73/49.7
See application file for complete search history.

(56) References Cited

U.S. PATENT DOCUMENTS

| | | | | |
|---|---|---|---|---|
| 4,930,997 | A | 6/1990 | Bennett | 417/410 |
| 5,315,980 | A | 5/1994 | Otsuka et al. | 123/520 |
| 5,644,072 | A | 7/1997 | Chirco et al. | 73/49.2 |
| 5,763,764 | A | 6/1998 | Mieczkowski et al. | 73/40 |
| 5,898,108 | A | 4/1999 | Mieczkowski et al. | 73/118.1 |
| 6,089,081 | A | 7/2000 | Cook et al. | 73/118.1 |
| 6,158,270 | A | 12/2000 | Garman et al. | 73/40.7 |
| 6,283,097 | B1 | 9/2001 | Cook et al. | 123/520 |
| 6,314,797 | B1 | 11/2001 | Dawson et al. | 73/49.2 |
| 6,321,727 | B1 | 11/2001 | Reddy et al. | 123/520 |
| 6,330,878 | B1 | 12/2001 | Perry et al. | 123/519 |
| 6,390,073 | B1 * | 5/2002 | Meiller et al. | 123/519 |
| 6,446,492 | B2 | 9/2002 | Weldon et al. | 73/49.2 |
| 6,530,265 | B2 | 3/2003 | Dawson et al. | 73/49.7 |
| 6,616,036 | B2 | 9/2003 | Streicher et al. | 235/381 |
| 6,626,157 | B2 | 9/2003 | Perry | 123/516 |
| 6,679,230 | B2 | 1/2004 | Kanai et al. | 123/520 |
| 6,722,189 | B2 | 4/2004 | Fabre | 73/116 |
| 6,769,419 | B2 | 8/2004 | Kanai et al. | 123/520 |
| 6,880,383 | B2 | 4/2005 | McLain et al. | 73/49.2 |
| 6,924,978 | B2 | 8/2005 | DiStefano | 361/688 |
| 7,091,700 | B2 | 8/2006 | Kadouchi et al. | 320/132 |
| 7,387,014 | B2 | 6/2008 | Banyard | 73/49.7 |
| 2001/0032624 | A1 | 10/2001 | Perry | 123/510 |
| 2003/0196482 | A1 * | 10/2003 | Kanai et al. | 73/118.1 |
| 2006/0178804 | A1 | 8/2006 | Laichinger et al. | 701/115 |

* cited by examiner

*Primary Examiner*—Hezron Williams
*Assistant Examiner*—Rodney T Frank
(74) *Attorney, Agent, or Firm*—Bliss McGlynn, P.C.

(57) ABSTRACT

A test apparatus for an evaporative emission system includes a source of pressure (positive or negative), a sensor for sensing the pressure generated in the evaporative emission system, and an ECU which controls the operation of the source of pressure and receives signals from the sensor reporting the pressure in the vehicle evaporative emission system over time. The ECU compares the sensed data with the stored data representing standard baseline sample vehicles without any leaks to determine the presence of a leak in the evaporative emission system.

27 Claims, 3 Drawing Sheets

EVAPORATIVE EMISSION SYSTEM TEST APPARATUS AND METHOD OF TESTING AN EVAPORATIVE EMISSION SYSTEM

CROSS REFERENCE TO RELATED APPLICATIONS

This application claims the benefit of U.S. provisional patent application entitled "Evaporative Emission System Test Apparatus and Method of Testing an Evaporative Emission System," having Ser. No. 60/880,756, and filed on Jan. 16, 2007.

BACKGROUND OF THE INVENTION

1. Field of the Invention

The present invention is directed toward a test apparatus for an automotive evaporative emission system as well as a method of testing the automotive evaporative emission system.

2. Description of the Related Art

Automotive vehicles include fuel delivery systems having a fuel tank and fuel delivery lines. The fuel delivery lines typically include a plurality of conduits and associated connections operatively interconnecting the fuel tank with an internal combustion engine. A fuel pump is used to deliver the fuel under pressure from the tank to the engine via the fuel delivery lines. Many automotive vehicles are powered using gasoline as fuel. Gasoline is a volatile substance that generates gasses that, if untreated, are harmful to the environment. These gasses are generally referred to as evaporative emissions. Because they are gasses, these emissions can escape from the fuel system even through very small orifices that may present themselves throughout the fuel delivery system. Accordingly, various governmental authorities in countries throughout the world have long mandated that automotive vehicles include systems for preventing the release into the atmosphere of untreated or un-combusted fuel vapor generated in the fuel delivery system.

Thus, gasoline powered automotive vehicles typically include evaporative emission control systems that are designed to effectively deal with the evaporative emissions. Such systems typically include a vapor canister operatively connected in fluid communication with the fuel tank and the intake of the internal combustion engine. The vapor canister typically includes carbon or some other absorbent material that acts to trap the volatile evaporative emissions generated by the fuel system. A canister purge valve controls the flow of evaporative emissions between the canister and the intake of the engine. In turn, the operation of the canister purge valve is typically controlled by an onboard computer, such as the engine control module, or the like. During normal vehicle operation, and subject to predetermined operational characteristics, the canister purge valve is opened to subject the vapor canister to the negative pressure of the engine intake manifold. This purges the vapor canister of trapped gaseous emissions, effectively regenerating the canister so that it may absorb additional vapor.

During vehicle shutdown, the canister purge valve is closed and the evaporative emissions generated in the fuel system are routed from the fuel tank to the vapor canister where they are absorbed and stored for later purging as described above. During vehicle shutdown, the fuel system is effectively sealed from the ambient environment.

In addition to conventional evaporative emission control systems as described above, many governmental authorities have further mandated that these systems have self-diagnostic capabilities to determine if any leaks are present in the closed fuel system. As public concern over pollution has risen, some governmental authorities have promulgated tougher standards for automotive evaporative emission control systems. For example, the California Air Resource Board (CARB) now requires evaporative emission systems to detect leaks as small as 0.020 inches in diameter. In an effort to comply with these and other standards, there have been a number of evaporative emission systems and methods of operating same that are calculated to detect leaks as small as or smaller than 0.020 inches diameter. Many of these systems employ sensors adapted to detect the presence of a vacuum that is naturally generated in the emission space of the fuel tank after shutdown and after the fuel system has cooled. Other known evaporative emission systems employ positive pressure to test the sealed integrity of the fuel system. On-board diagnostic evaporative emission systems of the type proposed in the related art have generally worked for their intended purposes.

However, the strict standards promulgated by some governmental authorities have presented other problems during the manufacturing phase of the automotive vehicle. More specifically, certain governmental standards require original equipment manufacturers (OEM) to test the evaporative emission control systems and their associated diagnostic capabilities on at least a statistical sampling basis. In an automotive manufacturing environment, time is a precious commodity. The feasibility of any test within an automotive plant environment is strongly dependant upon the cycle time required for the test and by the flexibility of the integration of any testing procedures and equipment with the vehicle build process. This effort is further complicated by the fact that fuel systems must be tested intact. Thus, under current manufacturing processes, such tests often occur after final assembly of the fuel system and after the vehicles have been at least partially fueled. These procedures are commonly known in the art as "wet tests." Alternatively, it is also known to test the evaporative emission control system prior to any fueling by, for example, charging the fuel system with a visible gas. This approach is known as a "smoke test" or "dry test." Unfortunately, many of the currently available equipment and methods designed to detect leaks as small as 0.20 inches in diameter can take twenty to forty-five minutes or longer. Long test cycle times effectively preclude the opportunity to test every vehicle. Tests that are conducted on a statistical sampling basis still slow down the manufacturing process and result in increased manufacturing costs.

In view of these challenges, it is also known to delay evaporative emission control system testing until some time downstream in the vehicle delivery/sales process. For example, it has been proposed to conduct such tests at the dealership and before the vehicle is delivered to the end user. Unfortunately, the cost associated with downstream testing of the evaporative emission control system, especially in the event of a failure, further increases the cost to the manufacturer of the vehicle.

Accordingly, there remains a need in the art for a test apparatus designed to quickly and cost-effectively test the evaporative emission control system of an automotive vehicle. Furthermore, there remains a need in the art for such an apparatus that can be used to dry test the evaporative emission control system in low cycle times. In addition, there remains a need in the art for such an apparatus that can be operated under these conditions to quickly detect leaks as small as 0.20 inches diameter. There also remains a need in the art for such an apparatus that is light-weight, portable and that may be operated by a single technician in an automotive manufacturing environment. Finally, there remains a need in the art for an improved method of testing an automotive evaporative emission control system in a way that facilitates low cost, low cycle times, and convenience during the vehicle build process.

SUMMARY OF THE INVENTION

The present invention overcomes the deficiencies in the related art in a test apparatus for an automotive evaporative emission system. The test apparatus includes a source of pressure adapted to generate a pressure in the vehicle's evaporative emission system that is different from the ambient pressure. A sensor is employed to sense the pressure generated in the evaporative emission system. An electronic control unit controls the operation of the source of pressure and receives signals from the sensor reporting the pressure of the vehicle's evaporative emission system over time. The electronic control unit further compares the sensed pressure data with stored data representing standard baseline for sample vehicles without any leaks to determine the presence of a leak in the vehicle's evaporative emission system. A method of testing the automotive evaporative emission system is also disclosed.

The present invention is also directed toward a method for testing a vehicle evaporative emission system including the step of providing a source of pressure to the vehicle's evaporative emission system that is different from the ambient pressure and sensing the status of the pressure in the evaporative emission system over time. In addition, the method includes the step of comparing the sensed data with stored data representing standard baseline pressures for vehicles without leaks to determine the presence of a leak in the evaporative emission system.

In this way, the test apparatus of the present invention provides a quick and cost-effective dry test of an evaporative emission control system for an automotive vehicle in very low cycle times. In addition, the test apparatus of the present invention may be employed to detect leaks smaller than the government regulated 0.020 inches diameter. The test apparatus of the present invention achieves these results while remaining light-weight and portable. Thus, the test apparatus of the present invention may be operated by a single technician in an automotive manufacturing environment. Finally, the test apparatus of the present invention as well as the method of testing an evaporative emission system of the present invention facilitates low cost, low cycle time, and convenience during the vehicle build process.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
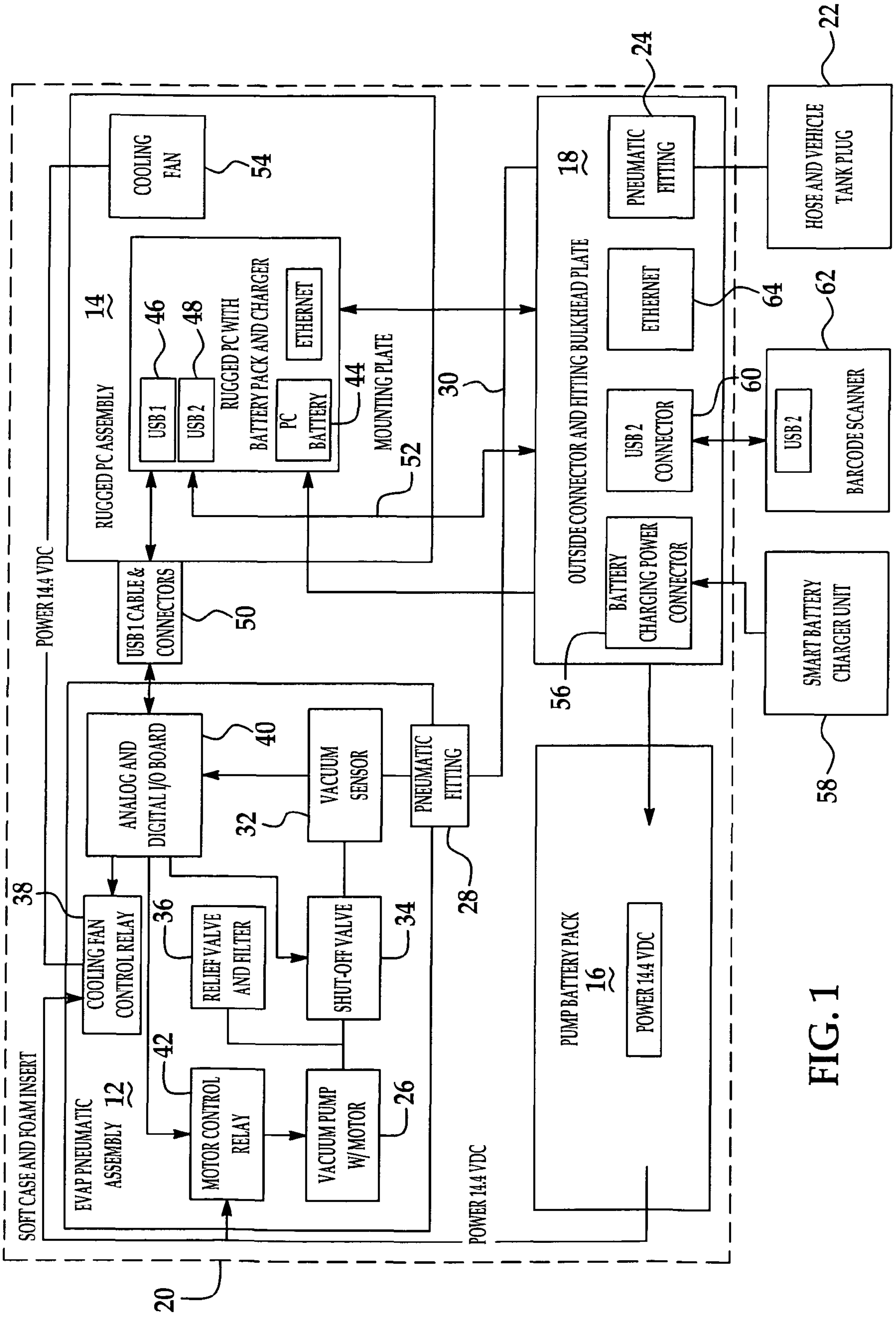
FIG. 1 is a block diagram schematically illustrating the test apparatus of the present invention.

Referring now to the figures, a test apparatus for an automotive evaporative emission system is generally indicated at 10 in the schematic drawing of FIG. 1. The apparatus 10 includes an evaporative pneumatic assembly 12 that is operatively controlled by an electronic control unit, generally indicated at 14. A pump battery pack, generally indicated at 16, is electrically connected to the evaporative pneumatic assembly 12 as will be described in greater detail below. Each of the evaporative pneumatic assembly 12, the electronic control unit 14, and the pump battery pack 16 are in either electrical or fluid communication with an outside connector and fitting bulkhead plate 18 as will be described in greater detail below. Each of these components is also encased in a soft case enclosure, schematically illustrated by the phantom lines at 20. The soft case design allows a "scratch proof" unit to be used in testing vehicles. The case 20 may also enclose high density foam packing that provides flexible and cost-effective mounting of the components described above. However, from the description that follows, those having ordinary skill in the art will appreciate that these components may be encased or otherwise housed in any suitable structure and that the exact physical characterization of the housing has no effect on the scope of the present invention.

The test apparatus 10 of the present invention also includes a hose and vehicle tank plug, schematically illustrated at 22. In its operative environment, the vehicle tank plug is mounted to the vehicle fuel filler neck in place of the fuel cap. The hose extends between the vehicle tank plug and a pneumatic fitting 24 presented by the outside connector and fitting bulkhead plate 18. In this way, the test apparatus 10 of the present invention is operatively connected to the fuel system, and thus the evaporative emission control system, of the automotive vehicle.

The evaporative pneumatic assembly 12 includes a source of pressure 26 that is in fluid communication with the pneumatic fitting 24 on the bulkhead plate 18 and thus the hose and vehicle tank plug 22 via a pneumatic fitting 28 on the evaporative pneumatic assembly 12 and a conduit or the like 30 extending between the pneumatic fitting 28 and the bulkhead 18. The source of pressure 26 is employed to generate a pressure in the vehicle's evaporative emission system which is different from the ambient pressure. As explained in greater detail below, in one preferred embodiment, the source of pressure 26 is employed to generate a negative pressure relative to the ambient pressure. However, those having ordinary skill in the art will appreciate from the description that follows that the source of pressure 26 may also be employed to generate a positive pressure relative to the ambient. A vacuum sensor 32 and shutoff valve 34 are operatively interconnected in fluid communication between the source of pressure 26 and the hose and vehicle tank plug 22 via the pneumatic fittings 24 and 28 as well as the conduit 30. A relief valve and filter 36 are interposed between the source of pressure 26 and the shutoff valve 34. The relief valve and filter 36 act to protect the vacuum sensor 32 from damage if the conduit 30 is damaged, clogged or for any reason is obstructed from normal volumetric flow that results in the vacuum levels at the pressure sensor 32 that exceed normal predetermined levels.

In the preferred embodiment, the source of pressure may include a vacuum pump 26. More specifically, the vacuum pump 26 may include a DC powered rotary vein pump having a capacity of, for example, sixteen liters per minute. The use of a rotary vein pump provides consistent volumetric flow rates throughout the life of the pump. This characteristic eliminates calibration drift caused by wear of the pump. The vacuum pump 26 may be powered using off-the-shelf commercially available batteries. This results in lower system costs for both the test assembly 10 and any battery re-charging units. Moreover, the use of a rotary vein pump provides consistent volumetric flow rates through a wide range of battery voltages as the DC battery discharges. However, those having ordinary skill in the art will appreciate that there are numerous types of pumps which have a sufficient capacity to be employed in the test apparatus 10 of the present invention. Accordingly, it will be appreciated from the description herein that the invention is in no way limited to the particular type of pump employed herein.

In the preferred embodiment, the shutoff valve 34 may include a normally closed, DC powered, ¼ inch latching isolation valve. The shutoff valve 34 mechanically “isolates” the evaporative system under test from the tester pump as will be described in greater detail below. Thus, the vacuum pump 26 is not required to be “backwards leak proof.” Because the shutoff valve 34 is normally closed, power is only required from the DC battery for a short period of time during pump down, which typically lasts about five seconds. Moreover, where a latching valve is employed for the shutoff valve 34, current is only required to unseat the valve. The valve then holds its position without the need of power draw from the DC auxiliary battery. This extends the life of the battery operation system. At the same time, however, those having ordinary skill in the art will appreciate that there are many different types of valves which may be suitable for this purpose. Accordingly, it will be appreciated that the present invention is in no way limited to the particular type of valve preferred by the inventors in this case.

In the preferred embodiment, the vacuum sensor 32 may include a differential pressure sensor adapted to sense pressures between −3 inches of water to +3 inches of water. Those having ordinary skill in the art will appreciate that the present invention is not limited to a differential pressure sensor. However, it should be noted that in the operative environment contemplated for the test apparatus 10 of the present invention, the use of a differential pressure sensor (versus an absolute pressure sensor) ensures that the calibration does not drift with changes in atmospheric pressure. This feature reduces the maintenance required to maintain the test apparatus 10, which ultimately lowers the cost of the operation of the test apparatus 10. In addition, a differential pressure sensor having a small range of −3 to +3 inches of water ensures very high signal-to-noise ratios within the typical operating range of the vehicle’s natural vacuum system. This allows a test of the automotive evaporative emission control system to be conducted in a minimum amount of time with the maximum amount of accuracy.

The evaporative pneumatic assembly 12 may also include a cooling fan 38 that is likewise powered by the pump battery pack 16. In the preferred embodiment, the pump battery pack 16 includes a four cell lithium poly battery pack. The use of a four cell pack provides approximately 14.4 volts which is ideal for both the operation of the vacuum pump 26 as well as the shutoff valve 34. Moreover, this feature facilitates the use of off-the-shelf 12-volt rated components that are easily operated at all ranges of battery discharge without the need for a voltage regulator. Since no voltage regulator is required for the operation of the test apparatus 10 of the present invention, the evaporative pneumatic assembly 10 does not expel heat associated with voltage regulation. By powering the vacuum pump and shutoff valve directly, the apparatus 10 also does not expend additional power from the battery pack 16 that would be associated with a voltage regulator. The use of lithium poly battery technology provides the highest current with the lowest size and weight requirements for the apparatus 10 of the present invention. This facilitates the reduction in the size and weight of the apparatus. Moreover, lithium poly battery technology and its associated charging components are available “off-the-shelf” and thus provide cost-effective solutions to the recharging issue. Nevertheless, from the description set forth herein, those having ordinary skill in the art will appreciate that the present invention may be practiced using any battery technology now known or invented in the future.

The evaporative pneumatic assembly 12 also includes an analog-to-digital (A/D) converter 40 having an input output board that is used to electrically interface between the electronic control unit 14 and the vacuum pump 26 as well as a shutoff valve 34. A motor control relay 42 may be electrically interposed between the analog-to-digital converter 40 and the vacuum pump 26. The motor control relay 42 is also electrically connected between the pump batter pack 16 and the vacuum pump 26. In the preferred embodiment, the motor control relay may include a solid state DC relay. The use of a solid state relay eliminates the need for fly back diodes and other protective circuitry associated with mechanical relays. Moreover, solid state relays consume very little power when operated which extends the operation time of the test apparatus on a single battery charge. In addition, solid state relays provide very little voltage drop when operating the pump 26 and shutoff valve 34 which further contributes to long operation time between charges. In addition, the use of a single solid state relay for both the vacuum pump 26 and the shutoff valve 34 simplifies the circuit and the software associated with operating the test apparatus 10 of the present invention. In a similar way, the differential vacuum sensor 32 is operatively controlled by the electronic control unit 14 through the A/D converter 40.

In the preferred embodiment, the electronic control unit 14 may include either an itronix tablet PC or ruggedized CE device. Either of these devices is preferred because both are sealed. No air flows into these devices for cooling. This can be important where the air in assembly plants is very oily or dirty. In the absence of a sealed electronic control unit, it may become fouled. In addition, the use of a sealed electronic control unit 14 prevents issues caused by condensation or any external moisture entering the control unit and damaging it. In one embodiment illustrated in FIG. 1, the electronic control unit 14 includes a pair of USB ports 46, 48. The USB port 46 is operatively connected to the A/D converter 40 through other appropriate connectors and cables schematically illustrated at 50. The electronic control unit 14 is further electronically connected to the outside connector and fitting bulkhead plate 18 through USB port 48 at electrical connector schematically illustrated at 52. The electronic control unit may also include a cooling fan 54.

The outside connector and fitting bulkhead plate 18 provides effective interface between the test assembly 10 of the present invention and any external components. To this end, the bulkhead plate 18 may include a battery charging power connector 56 that facilitates connection with a smart battery charger unit 58. The bulkhead plate may also include a USB connector schematically illustrated at 60 which is employed to interface with a barcode scanner 62. The barcode scanner 62 may be employed to read important information concerning the vehicle being tested. In addition, the bulkhead plate 18 may further provide an Ethernet connection 64 for further facilitating electronic communications between the test apparatus 10 and the electronic control unit 14.

The test apparatus 10 of the present invention may be employed during the automotive assembly process and before the vehicle has been fueled. Thus, the test apparatus 10 is particularly adapted for performing dry tests. In its operative mode, the tank plug 22 is placed in sealed communication with the opening of the fuel filler neck of a vehicle having an evaporative emission control system. The canister purge valve is closed and the vehicle evaporative emission system is essentially sealed or otherwise closed. The vacuum pump 26 is then actuated to draw a vacuum in the vehicle evaporative emission system. The vacuum sensor 32 senses the negative pressure generated in the vehicle evaporative emission system. When the vacuum has reached a predetermined level, the shutoff valve 34 is closed and the pump 26 is turned off. The relief valve 36 may be actuated in the event of a blockage or some other malfunction as a means of protecting the sensor 32 or vacuum pump 26.

Alternatively, and in addition to the process described above, the vacuum pump 26 may be employed to induce closure of the vehicle relief valve of the type that may be employed in some evaporative emission control systems known in the related art. More specifically, in at least one possible test scenario, the vacuum may be applied for approximately 5 seconds or until a negative pressure of −3 inches/$H_2O$ has been reached. The test procedure may then pause for 3 to 4 seconds for the vehicle pressure relief valve to "settle" before taking the next step in the process. The vacuum in the system is then monitored for approximately 30 seconds. The pressure data sensed by the sensor 32 is then stored in a log file by the ECU 14. The log file may contain all decoded build information along with test status and all recorded sensor values.

The ECU 14 also includes software that is used to create histograms. The histograms are essentially compilations of relevant data derived from a series of test vehicles. This data constitutes baseline information against which the production vehicles are measured. The baseline data may be filtered by plant, carline, tank size, and leak size. Average pressure values for pre-selected time slices are calculated for the sample, baseline vehicles. The standard deviation for the sample set is also calculated and stored in the histograms. A density curve is then developed for the sample vehicles. Vehicles of a predetermined gas tank size without induced leaks represent the sample set. A critical point is then established to compare the performance of the production vehicles with the average value of the sample set. In one possible test scenario, the average value for vehicles with an induced leak of 0.010 inches represents a "critical point." Using this critical point, the difference between a "no leak" vehicle and a "0.010 in. leak" vehicle can be determined. A graph illustrating a leak differentiation comparison is shown in FIG. 3.

Figure 3:
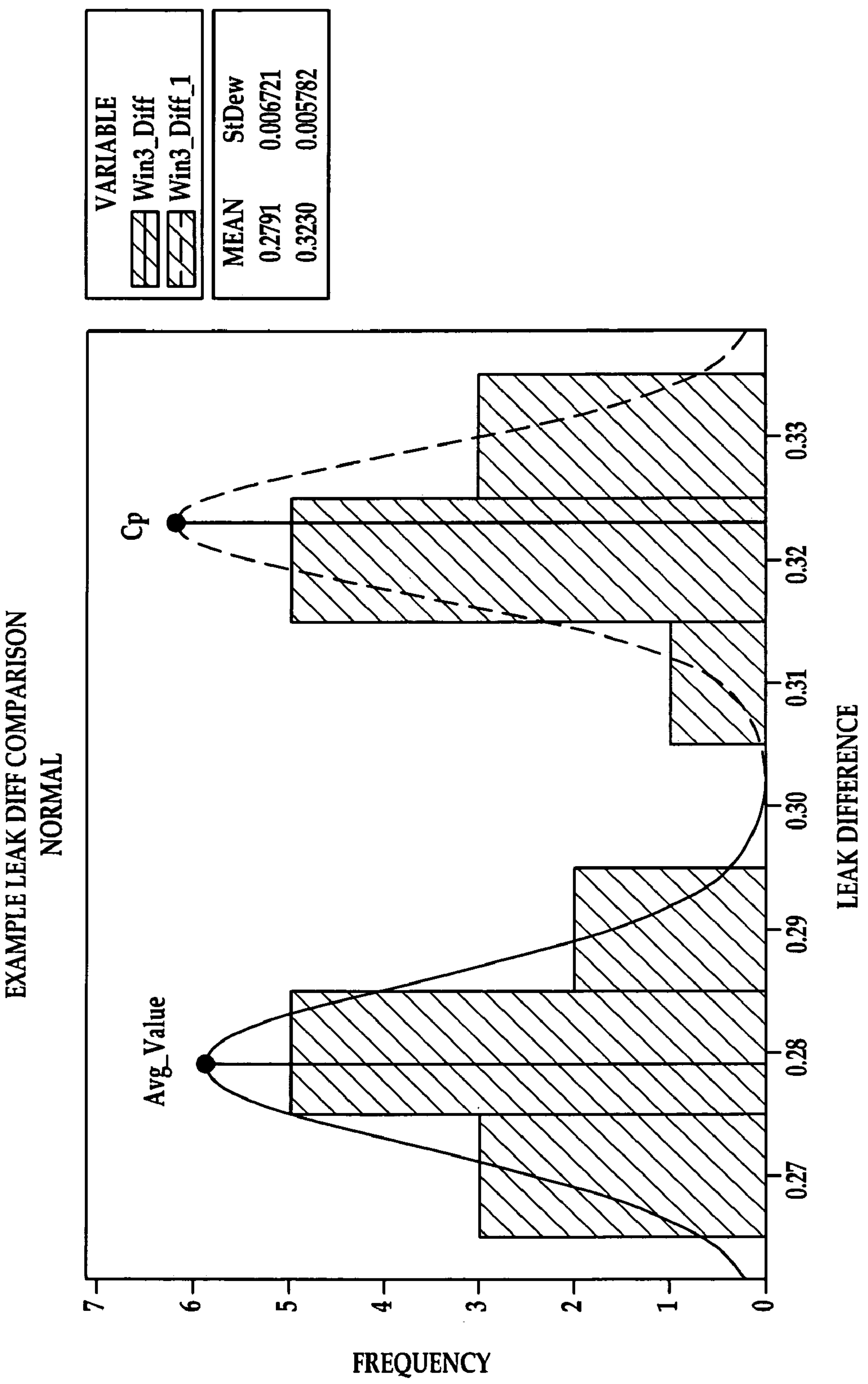
FIG. 3 is a graph illustrating a leak differentiation comparison.

The area under the density curve illustrated in FIG. 3 for a "no leak" vehicle between zero and the critical point can be calculated. This calculation may be conducted as follows:

$$\text{Accuracy}(t_0) = \left( \oint_{NoLeak} \left( \frac{(C_p - \mu_{NoLeak})}{\sigma_{NoLeak}} \right) \right) + 0.5000$$

$$C_p = \text{Critical\_Pt}$$

$$\mu_{NoLeak} = \text{Avg\_Value}_{NoLeak}$$

$$\sigma_{NoLeak} = \text{St\_Dev}_{NoLeak}$$

Using the above calculations, the accuracy for detecting only the "no leak" vehicles for a given time is determined by measuring the area under the density curve for the sample mean to the critical point, and then adding 0.5000 to account for all values in the curve that are less than the sample mean. The calculation of the average under the density curve is made using a "Z table." The area under the density curve for a given "Z value" may be determined as follows:

$$Z = \frac{(C_P - \mu)}{\sigma}$$

Where:
CP=Critical_Pt
μ=Avg_ValueNO LEAK
σ=St_DevNO LEAK

Using the calculations set forth above, the test apparatus 10 of the present invention is able to quickly, effectively, and accurately determine whether even small leaks may be present in an evaporative emission control system of production vehicles in under 30 seconds. Thus, there is no need for extended dry or wet tests. In addition, because of the speed with which the test may be employed, every vehicle in a production environment may be tested.

Figure 2:
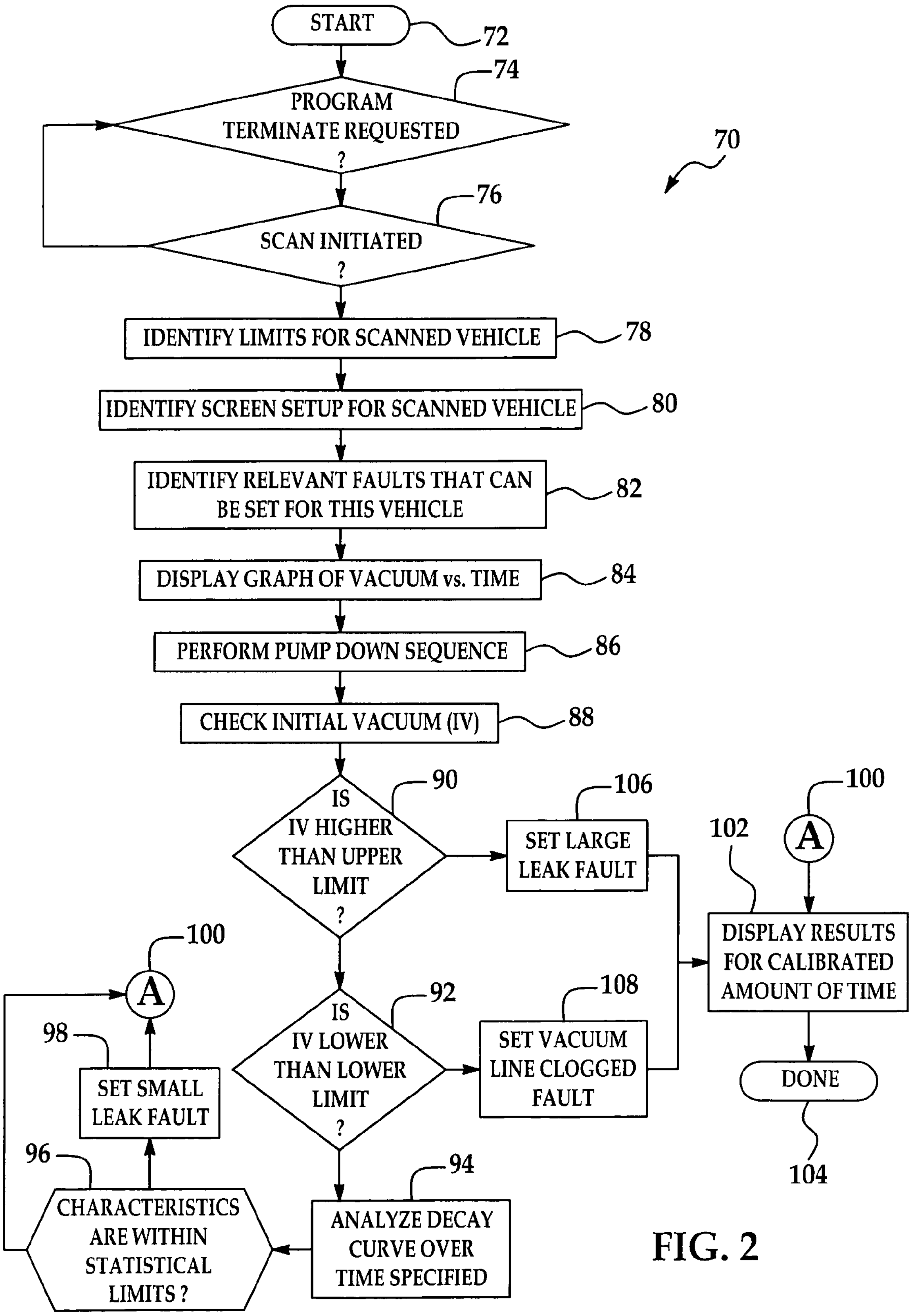
FIG. 2 is a flowchart illustrating the steps of the evaporative test program of the present invention.

A method of testing an evaporative emission system using the test apparatus 10 of the present invention may be further described with reference to the flowchart, generally indicated at 70 in FIG. 2. The method begins at 72 and proceeds to decision block 74 where it is determined whether a program-terminate command has been requested. If no such command has been requested, the method proceeds to decision block 76 where it is determined whether a scan of the vehicle has been initiated. If "yes," all relevant information concerning the vehicle is scanned using a barcode scanner. If a scan has not been initiated, the method returns to decision block 74 to determine whether a command to terminate the program has been requested. The method then proceeds to block 78 where the limits for the scanned vehicle are identified. The limits referred to at this step in the method include the statistical limit between what is deemed a good vehicle, and what is deemed a vehicle with a leak of defined size.

The method then advances to block 80 where the screen set up for the scanned vehicle is identified. The screen set up refers to navigation of the available vehicle configurations, and selection of the vehicle configuration resolved from the scan. The relevant faults that can be set for the vehicle scanned are then identified at block 82. These faults may include faults incurred by the system operation, such as faulty operation of the test system, or faults defined by the customer as failures within the system tested for a leak. These faults are linked with the limits of what is deemed a system leak of defined size. A graph of vacuum versus time is then displayed as indicated at block 84 on the graphic user interface that may be associated with the electronic control unit 14 of the test apparatus 10. The vacuum pump is then actuated as indicated at block 86 to draw a vacuum in the evaporative emission control system. Once this vacuum has been pulled, the initial vacuum present in the system is then determined as indicated at block 88. The method then advances to the decision block 90 where it is determined whether the initial vacuum is greater than an upper limit. If the answer to this question is "no," the method advances to decision block 92 where it is determined whether the initial vacuum is lower than the lower limit. If the answer to this inquiry is "no," the method further advances to block 94 where the decay of any vacuum over time is analyzed. This step involves performing the calculations discussed above and comparing the results of this calculation with the baseline data stored on the electronic control unit 14. The method then advances to decision block 96 where a determination is made whether the characteristics of the vehicle being tested are within statistical limits. If they are not, the method of the present invention determines that a small leak has occurred as indicated at block 98 and a small leak fault is then set. In the event of a small leak, the method further advances to the next step designated "A" and identified with reference numeral 100. The results for the test performed over a calibrated amount of time are then displayed on the graphic user interface as indicated at block 102. The method then proceeds to completion as indicated at 104. If the characteristics of the vehicle being tested are within statistical limits as indicated at 96, the method also advances to block A identified at reference numeral 100 and then the results are displayed on the graphic user interface as indicated at 102.

If a determination is made at decision block 90 that the initial vacuum is higher than the upper limit, the method proceeds to set a large leak fault as indicated at block 106. Alternatively, if a determination is made at decision block 92 that the initial vacuum is lower than the lower limit, the method proceeds to set a vacuum line clogged fault as indicated at block 108. In either circumstance identified in blocks 106 and 108, the results of these determinations are displayed on the graphic user interface as indicated at 102 and the method proceeds to completion as indicated at 104.

In this way, the test apparatus 10 of the present invention provides a quick and cost-effective dry test of an evaporative emission control system for an automotive vehicle in very low cycle times. In addition, the test apparatus 10 of the present invention may be employed to detect leaks as small as 0.020 inches diameter. The test apparatus 10 of the present invention achieves these results while remaining lightweight and portable. Thus, the test apparatus 10 of the present invention may be operated by a single technician in an automotive manufacturing environment. Finally, the test apparatus 10 of the present invention as well as the method of testing an evaporative emission system of the present invention facilitates low cost, low cycle time, and convenience during the vehicle build process.

The present invention has been described in an illustrative manner. It is to be understood that the terminology that has been used is intended to be in the nature of words of description rather than of limitation. Many modifications and variations of the present invention are possible in light of the above teachings. Therefore, the present invention may be practiced other than as specifically described.

What is claimed is:

1. A test apparatus for an evaporative emission system, said apparatus comprising:

- a source of pressure adapted to generate a pressure in the vehicle's evaporative emission system that is different from the ambient pressure;
- a sensor for sensing the pressure generated in the evaporative emission system; and
- an electronic control unit adapted to control the operation of the source of pressure and to receive signals from said sensor reporting the pressure of the vehicle's evaporative emission system over time, said electronic control unit further acting to compare the sensed data with stored data representing an average value of standard baseline pressures for vehicles without leaks to determine whether the pressure characteristics are within statistical limits and the presence of a leak in the evaporative emission system.

2. The test apparatus as set forth in claim 1 wherein said source of pressure is in fluid communication with said pneumatic fitting and said pneumatic fitting adapted to communicate with other components external to said apparatus.

3. The test apparatus as set forth in claim 2 wherein said source of pressure is a vacuum pump.

4. The test apparatus as set forth in claim 3 wherein said vacuum pump is a DC powered rotary vein pump.

5. The test apparatus as set forth in claim 2 wherein said sensor is disposed in fluid communication between said pneumatic fitting and said source of pressure to monitor the pressure generated by said source of pressure.

6. The test apparatus as set forth in claim 1 wherein said sensor is a differential pressure sensor.

7. The test apparatus as set forth in claim 1 further including a shutoff valve disposed in fluid communication between said sensor and said source of pressure.

8. The test apparatus as set forth in claim 7 wherein said shutoff valve is a normally closed latching solenoid isolation valve.

9. The test apparatus as set forth in claim 7 further including a relief valve and filter disposed in fluid communication between said source of pressure and said shutoff valve, said relief valve and filter serving to protect said sensor from damage due to elevated pressure levels.

10. The test apparatus as set forth in claim 7 further including an analog-to-digital converter disposed in electrical communication between said electronic control unit and said source of pressure as well as said shutoff valve to convert signals from analog to digital.

11. The test apparatus as set forth in claim 10 wherein said electronic control unit further includes first and second USB ports, said first USB port in electrical communication with said analog-to-digital converter, said second USB port providing electrical communication between said electronic control unit and a bulkhead plate.

12. The test apparatus as set forth in claim 1 wherein said electronic control unit includes a cooling fan.

13. The test apparatus as set forth in claim 1 wherein said test apparatus further includes a battery pack.

14. The test apparatus as set forth in claim 13 wherein said battery pack includes a plurality of lithium poly batteries.

15. The test apparatus as set forth in claim 1 wherein said apparatus further includes a bulkhead plate 18 that provides electrical and fluid communication with other components external to said apparatus.

16. The test apparatus as set forth in claim 15 wherein said bulkhead plate includes a pneumatic fitting providing fluid communication with components external to said apparatus.

17. The test apparatus as set forth in claim 15 wherein said bulkhead plate includes a charging power connector for providing electrical communication with a battery charger.

18. The test apparatus as set forth in claim 15 wherein said bulkhead plate includes a USB connector for providing electrical communication with electrical components operatively connected to said apparatus.

19. The test apparatus as set forth in claim 15 wherein said bulkhead connector includes an Ethernet for facilitating electronic communications between said electronic control unit and other components of said apparatus.

20. The test apparatus as set forth in claim 13 wherein said apparatus further includes a cooling fan powered by said battery pack.

21. The test apparatus as set forth in claim 20 wherein said apparatus further includes a motor-control relay disposed in electrical communication between said battery pack and said source of pressure.

22. The test apparatus as set forth in claim 21 wherein said motor control relay is a DC relay.

23. The test apparatus as set forth in claim 1 wherein said apparatus further includes a vehicle tank plug adapted to be mounted to the vehicle fuel filler neck.

24. A method for testing a vehicle evaporative emission system, said method including the steps of:

providing a source of pressure to the vehicle's evaporative emission system that is different from the ambient pressure;

sensing the status of the pressure in the evaporative emission system over time;

comparing the sensed data with stored data representing an average value of standard baseline pressures for vehicles without leaks to determine whether the pressure characteristics are within statistical limits and the presence of a leak in the evaporative emission system.

25. The method for testing a vehicle evaporative emission system as set forth in claim 24 wherein the step of sensing the pressure generated in the evaporative emission system includes making an initial check;

determining if the initial check finds a pressure above an upper limit; and determining if the initial check measures a pressure below a lower limit.

26. The method for testing a vehicle evaporative emission system as set forth in claim 24 further including the step of displaying the results of the comparison of the sensed data to the stored data.

27. The method for testing a vehicle evaporative emission system as set forth in claim 24 further including the steps of electronically identifying the test vehicle using a bar code scan before the step of providing a source of pressure to the vehicle's evaporative emission system.

* * * * *